United States Patent [19]

Nakajima

[11] Patent Number: 5,287,402
[45] Date of Patent: Feb. 15, 1994

[54] DATA COMMUNICATION APPARATUS

[75] Inventor: Toshifumi Nakajima, Tokyo, Japan

[73] Assignee: Canon Kabushiki Kaisha, Tokyo, Japan

[21] Appl. No.: 743,024

[22] Filed: Aug. 9, 1991

[30] Foreign Application Priority Data

Aug. 13, 1990 [JP] Japan .................. 2-211668

[51] Int. Cl.$^5$ .......................... H04M 11/00
[52] U.S. Cl. .................. 379/100; 358/438; 358/434; 358/435; 358/436
[58] Field of Search .......... 379/100, 96, 97, 98, 379/355, 354; 358/438, 434, 435, 436, 468

[56] References Cited

U.S. PATENT DOCUMENTS

| | | | |
|---|---|---|---|
| 4,571,463 | 2/1986 | Shefler | 379/355 |
| 4,772,955 | 9/1988 | Kurahayashi et al. | 379/100 |
| 4,773,080 | 9/1988 | Nakajima et al. | |
| 4,800,439 | 1/1989 | Yoshino. | |
| 4,908,851 | 3/1990 | Kotani et al. | 379/100 |
| 4,910,610 | 3/1990 | Utsugi | 379/100 |
| 4,956,860 | 9/1990 | Murata | 379/100 |
| 5,127,047 | 6/1992 | Bell et al. | 379/100 |

FOREIGN PATENT DOCUMENTS 58-200655 11/1983 Japan .

OTHER PUBLICATIONS

Pat. Abs. Jp. vol. 12, No. 469, Dec. 8, 1988 (JP63-189046).

Primary Examiner—Jin F. Ng
Assistant Examiner—Jason Chan
Attorney, Agent, or Firm—Fitzpatrick, Cella, Harper & Scinto

[57] ABSTRACT

There is disclosed a facsimile apparatus which transmits a predetermined signal, such as CNG signal, during pause periods succeeding the transmission of telephone number signals. This operation prevents the delay of CNG signal detection in case the receiving side has an automatic telephone/facsimile switching function, and also prevents the facsimile communication being erroneously cut off in case the pause period of the calling side eventually overlaps with the CNG detection period of the receiving side.

14 Claims, 6 Drawing Sheets

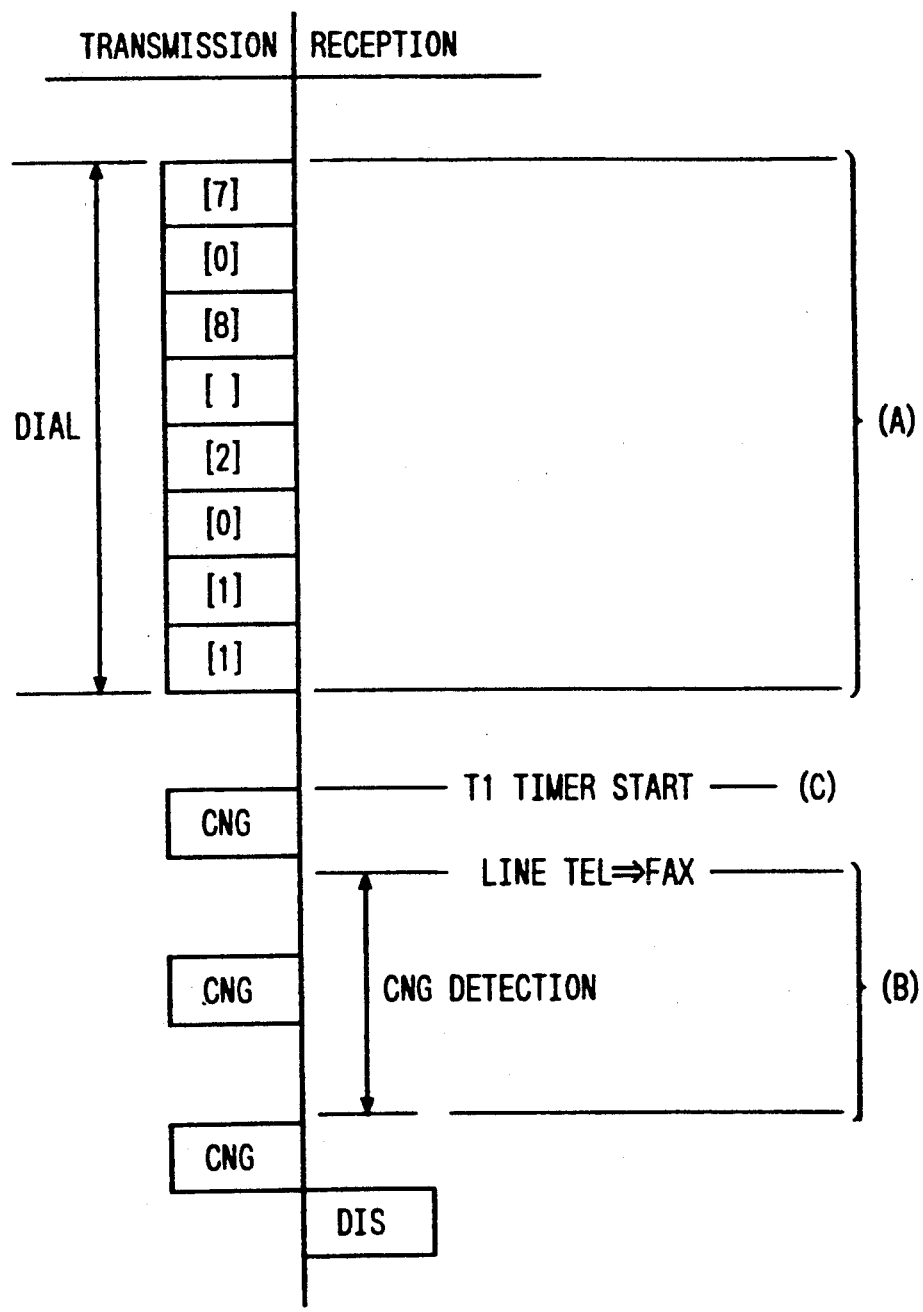

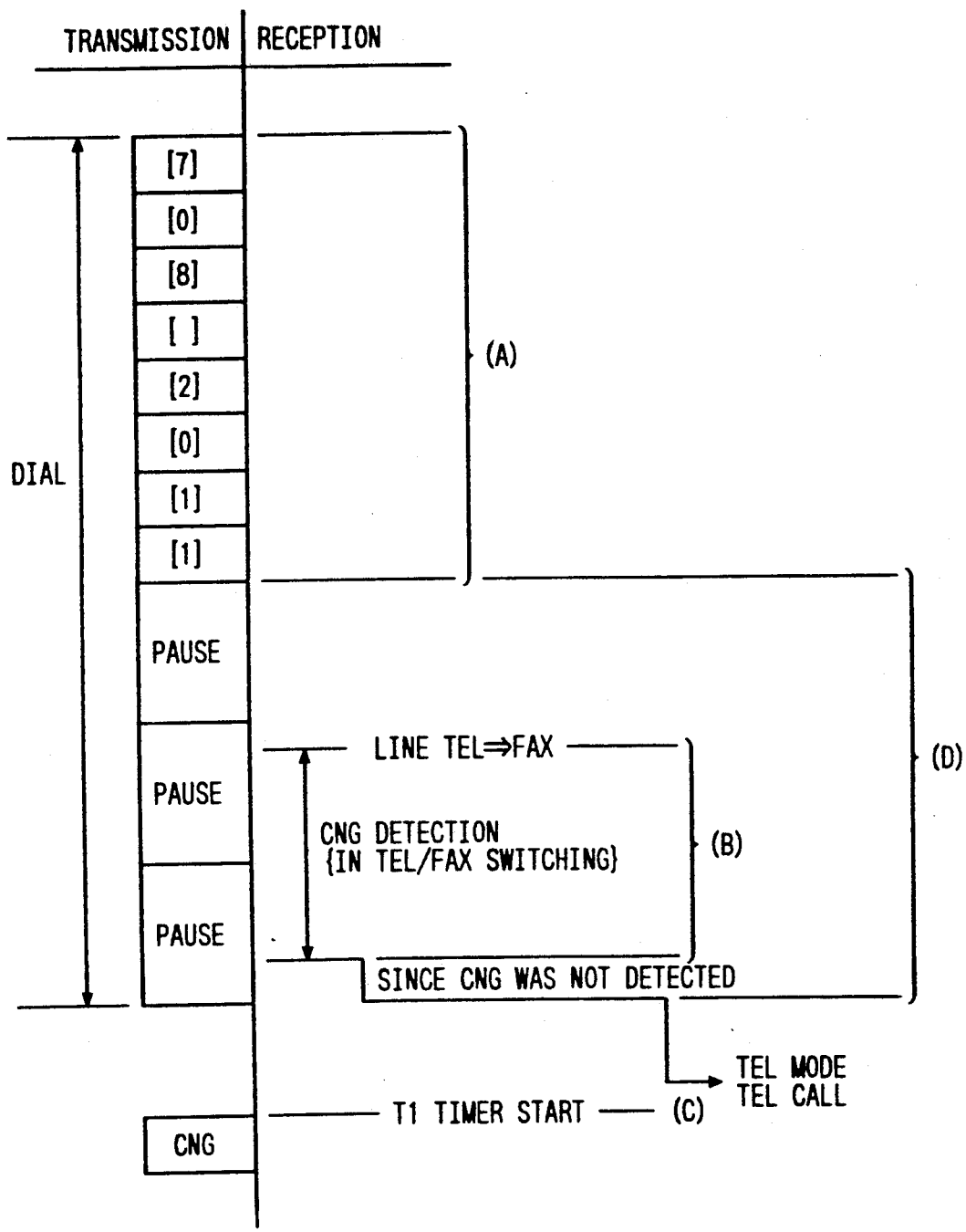

DATA COMMUNICATION APPARATUS

BACKGROUND OF THE INVENTION

1. Field of the Invention

The present invention relates to a data communication apparatus for effecting data communication after sending out a dialling signal.

2. Related Background Art

There is already known a facsimile apparatus which is capable of calling a destination station and thereafter automatically effecting facsimile communication. In the facsimile communication, it is customary to set a time for initial identification (TI) for detecting an effective response signal from the destination and to inspect the expiration of said time by so-called TI timer.

It is also already known, at making a call, to enter or store in advance pause data for determining the timing of start of facsimile communication, in addition to the telephone number data.

FIG. 6 shows the sequence of signals in call making in a conventional facsimile apparatus, wherein the left-hand side shows the signals from the calling (image transmitting) side while the right-hand side shows the signals of the called (image receiving) side.

As shown in FIG. 6, the calling side transmits dial data (tone or pulse signals) A corresponding to the telephone number, and then CNG signals.

The called side, in case of automatic reception, switches the line to the facsimile unit, and, upon detection of the CNG signal, transmits a protocol signal (such as DIS) of the called side.

FIG. 7 shows a case of providing a pause period according to pause data entered in advance. A pause period D is provided after the transmission of the dial data. In the illustrated example, there are inserted three pause periods of a unit length each, corresponding to three sets of pause data.

At a pause digit, the conventional facsimile apparatus interrupts the transmission of dial data and does not transmit any signal to the telephone line (D in FIG. 7).

The TI timer is started after the transmission of all digits (including pause data), as indicated by C in FIG. 7. The transmission of the CNG (facsimile call) signal is started after the start of said TI timer.

In an overseas automatic call, plural pause periods are automatically set or registered by the user at the end of dial data as shown in FIG. 7, in order to prevent the transmission from being inhibited by the overflow of the TI timer as the connection time is longer in such call.

However, in such conventional structure, if the receiving side is a facsimile apparatus with automatic telephone/facsimile switching function, the detection of the CNG signal is delayed by the time of the pause period inserted by the calling side, because the CNG signal transmission is started after the processing of the pause digit. Also if the CNG detecting period of the receiving side overlaps with the pause period of the calling side as shown in FIG. 7, the receiving side may mistake the call as a telephone call, whereby the facsimile communication may be terminated by an error ending.

SUMMARY OF THE INVENTION

An object of the present invention is to provide an improvement in a data communication apparatus effecting communication according to a predetermined protocol.

Another object of the present invention is to improve reliability of the data communication apparatus.

Still another object of the present invention is to reduce the time required for the protocol for data communication.

Still another object of the present invention is to provide a data communication apparatus capable of detecting a predetermined signal from the called side, even in the presence of a variation in the connection time after the completion of transmission of dial signals.

Still another object of the present invention is to provide a data communication apparatus designed to transmit a predetermined signal during a pause period after the transmission of dial signals.

Still other objects of the present invention will become apparent from the following description of embodiments to be taken in conjunction with the attached drawings.

BRIEF DESCRIPTION OF THE DRAWINGS

FIGS. 6 and 7 are charts showing signal sequences in a conventional apparatus.

DETAILED DESCRIPTION OF THE PREFERRED EMBODIMENTS

Figure 1:
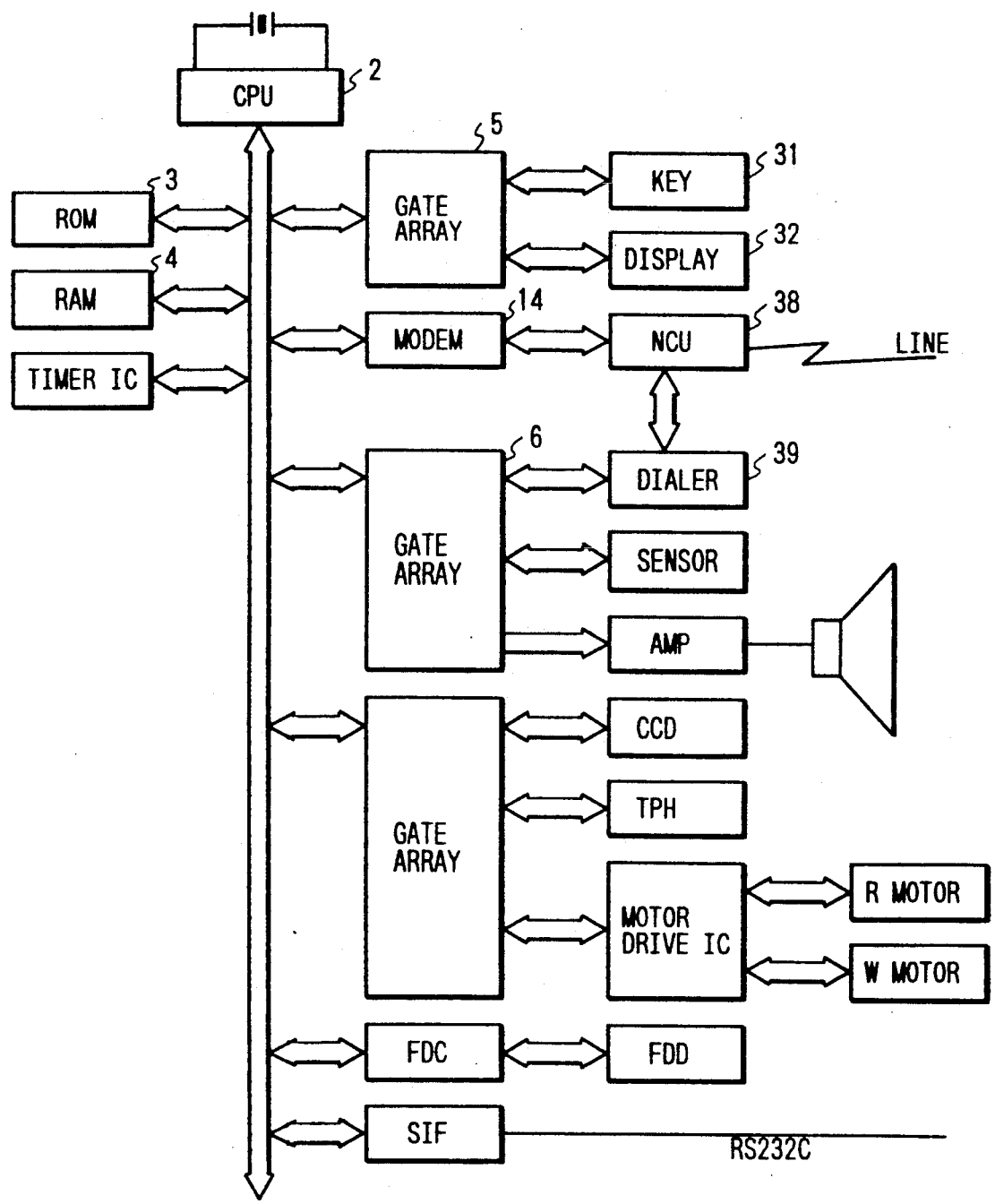
FIG. 1 is a block diagram of a facsimile apparatus embodying the present invention.

FIG. 1 shows the structure of an image transmission apparatus embodying the present invention.

Referring to FIG. 1, a CPU 2, connected by an address/data bus with a ROM 3 and a RAM 4, controls the entire facsimile apparatus and also controls the encoding and decoding of image data.

A gate array 5 controls the input/output of keys (numeral keys, a pause key, function keys etc.) 31 of an operation panel, and of a display unit 32.

A modem 14, connected to a telephone line through a network control unit (NCU) 38, effects encoding and decoding of image data and also effects transmission and reception of protocol signals for the facsimile communication.

A dialler 39 sends tone or pulse dial signals to the telephone line through the NCU 38. The dial data are given by the CPU 2 through a gate array 6. The telephone number of a destination station is registered in the RAM 4, according to the manipulation of the keys 31 of the operation panel.

The function of the above-explained circuit structure will be explained in the following, with reference to FIG. 2.

Figure 2:
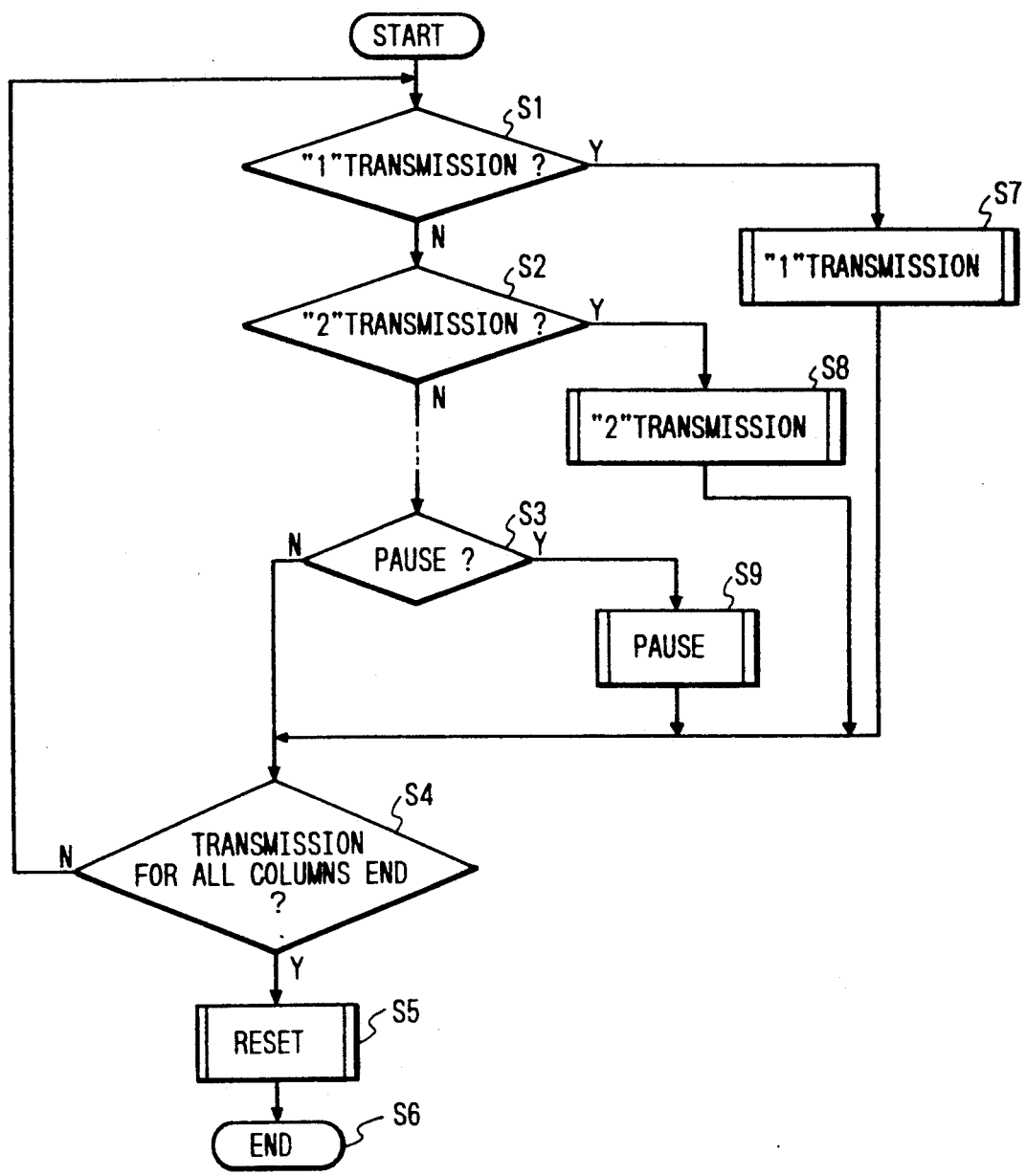
FIGS. 2 and 3 are flow charts showing control sequence of a CPU shown in FIG. 1.

FIG. 2 shows a calling control executed by the CPU 2 shown in FIG. 1. Steps S1 to S3 are to detect numbers "0"–"9", symbols "#", "*" etc. and a code corresponding to a pause, in the call data. Said call data are stored in the RAM 4 in advance, corresponding for example to key manipulations for entering the facsimile number of the destination station.

Figure 4:
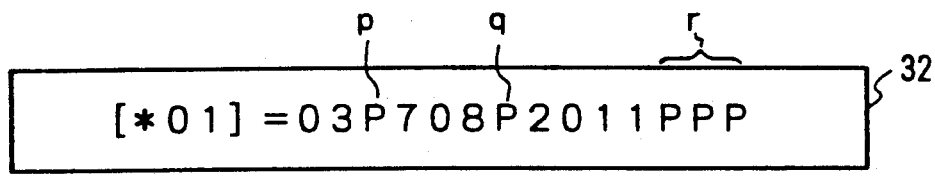
FIG. 4 is a view showing an example of display in a display unit shown in FIG. 1.

FIG. 4 shows an example of a display on the display unit 32, at the key entry of the facsimile number of the destination station, wherein a pause data, entered by a predetermined key operation, is indicated by "p" on the display. In the illustrated example, two and three pauses are inserted respectively in the middle of and at the end of the telephone number. Said display corresponds to the telephone number data stored in the RAM 4.

When there is conducted for example a shortened dialling operation, the CPU 2 executes the detections of codes in the steps S1, S2, . . . , and, upon detection of corresponding codes, activates the dialer 39 in steps S7, S8, . . . to transmit dial signals to the telephone line, with an increment of a telephone number digit counter (column counter) at each signal transmission. Then a step S4 discriminates the transmission of all the digits of dial signals, by detection of a predetermined end signal (or by storing the number of digits at the start of telephone number data). If the determination in step S4 is negative the process is repeated from the step S1 whereby the dial signals of plural digits are transmitted. When the step S4 turns out affirmative, a step S5 executes a predetermined resetting process to terminate the dialling process.

Figure 3:
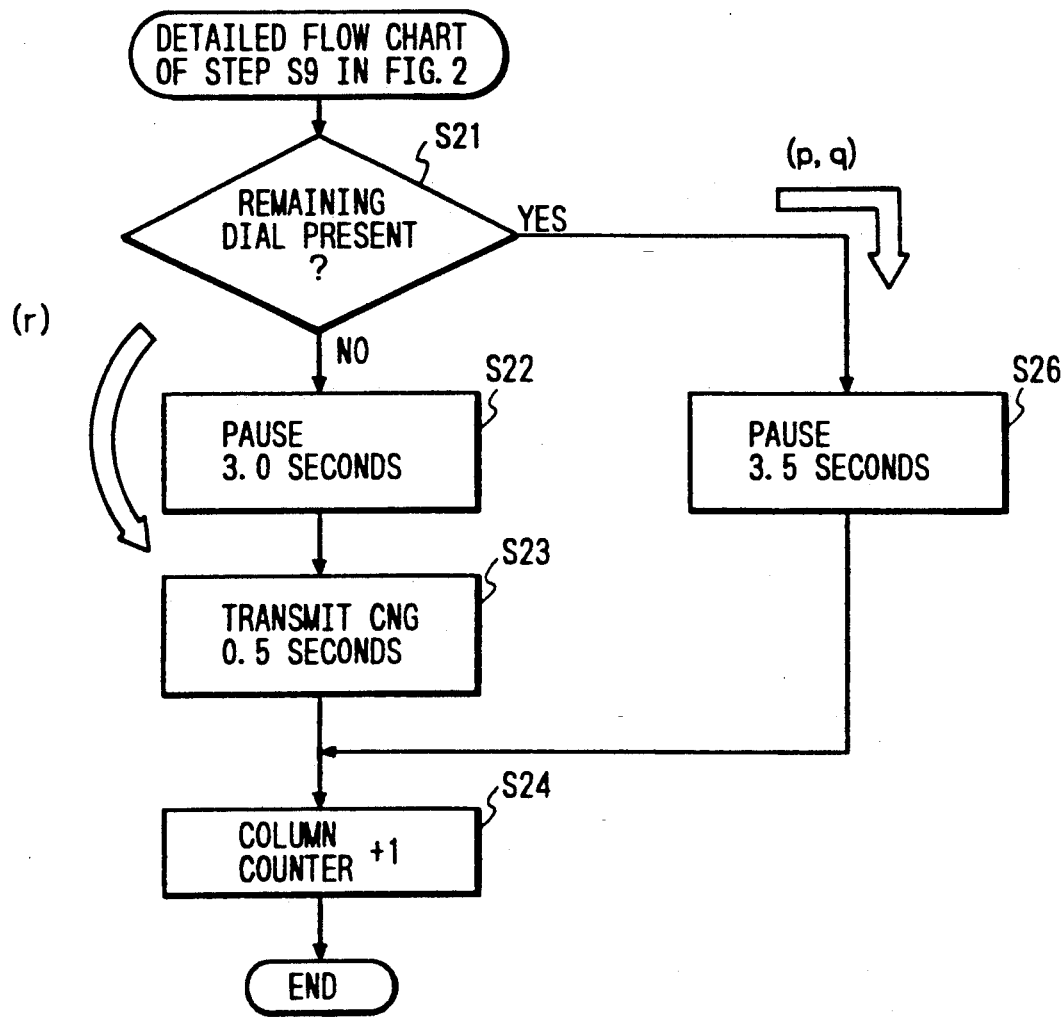

FIG. 3 shows the details of a pause process in a step S9 in FIG. 2. In a step S21 in FIG. 3, the CPU 2 discriminates whether dial data to be transmitted still remain in a predetermined area of the RAM 4.

If the step S21 identifies that such data still remain (pause data p, q in FIG. 4), the CPU 2 forms a pause period of 3.5 seconds by awaiting a corresponding time (step S26), then effects a step increment of the telephone number digit counter (step S24) and terminates the pause process.

On the other hand, if such data do not remain (pause data r in FIG. 4), the CPU 2 forms a pause period of 3 seconds by awaiting a corresponding time (step S22), and then transmits the CNG signal for 0.5 seconds (step S23). The CNG signal generally consists of a signal of 1100 Hz for 0.5 seconds, with an interval of 3 seconds. Thus the steps S22 and S23 are utilizing the transmission sequence of the CNG signal for the pause period.

Figure 5:
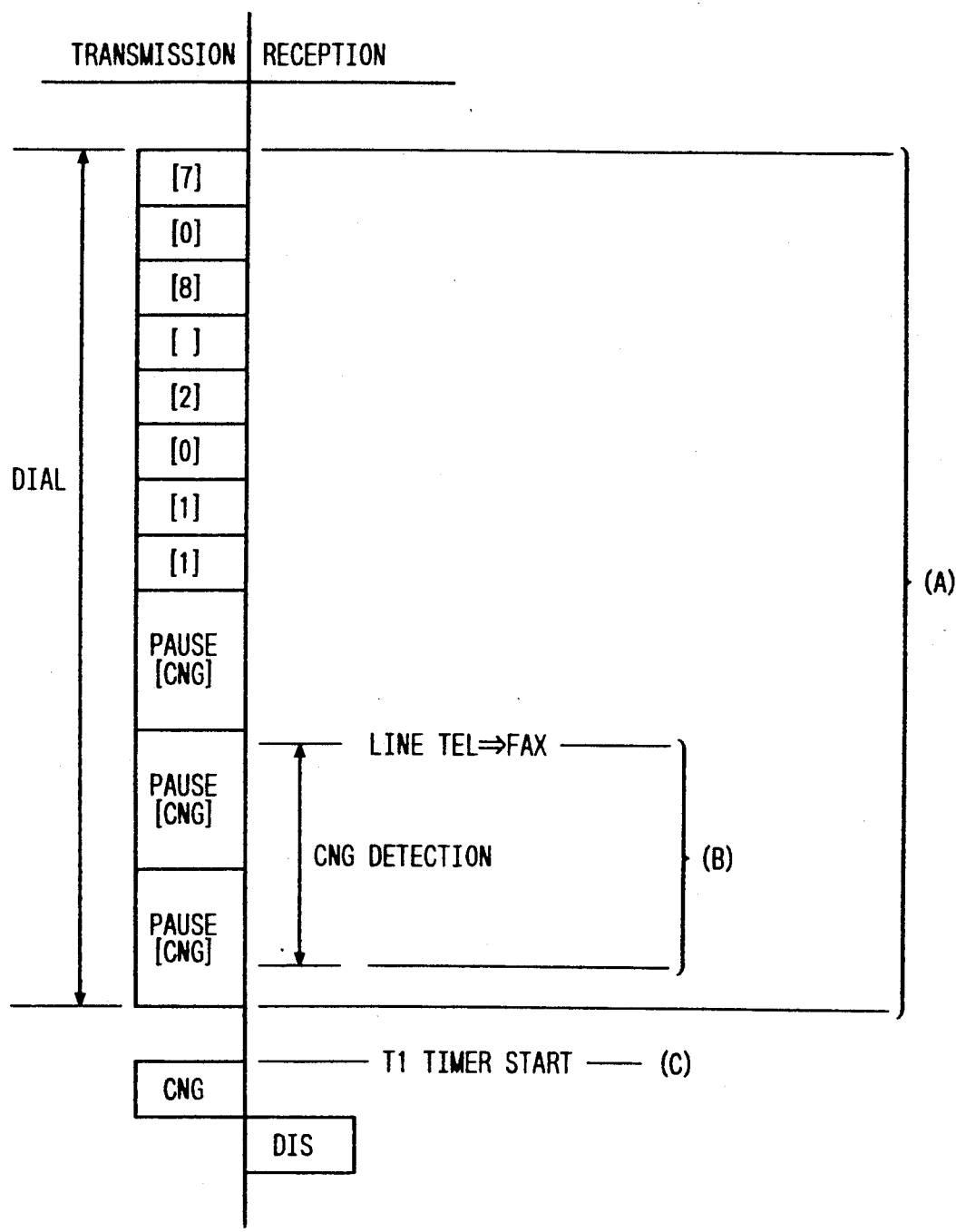
FIG. 5 is a chart showing a signal sequence in the apparatus shown in FIG. 1.

In the above-explained embodiment, a signal sequence shown in FIG. 5 is realized by the pause control explained above. FIG. 5 shows a case in which the called side has an automatic telephone/ facsimile switching function, as in the case of FIG. 7. As shown in FIG. 5, the three pause periods in FIG. 7 are replaced by three CNG transmission sequences.

Consequently, when a pause sequence is inserted at the end of the dial data for example for overseas calling and if said pause sequence overlaps with the CNG detection sequence of the called side, the called side can be securely transferred to the facsimile operation.

Also, as shown in FIG. 5, since the TI timer is started after the transmission of all the dialling digits including the pause data, the effective initial identification time is not shortened by the pause period.

Also the transmission of a CNG signal in the pause period is conducted only at the last pause data where the telephone numbers to be transmitted no longer remain, so that no erroneous operations can be induced in the called side.

The present invention is applicable likewise when the image transmission is conducted from the calling side to the called side or when it is conducted from the called side to the calling side (such as polling call).

The present invention has been explained by preferred embodiments thereof, but it is not limited to such embodiments and is subject to various modifications within the scope and spirit of the appended claims.

What is claimed is:

1. A data communication apparatus comprising:
   generator means for generating numerical data and pause data; and
   transmission means for transmitting a dial signal corresponding to the numerical data generated by said generator means and transmitting a predetermined signal after a transmission of the dial signal is terminated,
   wherein said transmission means is adapted to transmit the predetermined signal by a number of times corresponding to the pause data generated by said generator means between the transmission of the dial signal and a transmission of one additional said predetermined signal.

2. An apparatus according to claim 1, wherein said transmission means is adapted to transmit the predetermined signal in a part of a predetermined pause period, when the pause data are generated by said generator means.

3. An apparatus according to claim 1, wherein said transmission means is adapted to repeatedly transmit the predetermined signal by a number of times corresponding to the number of pause data generated by said generator means, with a predetermined interval, when plural pause data are generated in succession by said generator means.

4. An apparatus according to claim 1, wherein said transmission means is adapted when the pause data generated by said generating means are generated in the middle of a train of numerical data, to form a predetermined pause period between the transmission of the dial signal based on the numerical data preceding the pause data and the transmission of the dial signal based on the numerical data succeeding the pause data, and, when the pause data are generated by said generating means after the train of numerical data, to transmit the predetermined signal.

5. An apparatus according to claim 1, wherein the predetermined signal transmitted by said transmission means is a tone signal of 1100 Hz.

6. An apparatus according to claim 1, further comprising discrimination means for discriminating the response from the called side, in a period determined by the pause data.

7. A data communication apparatus comprising:
   setting means for setting dial data including numerical data and control data; and
   transmission means for transmitting dial signals based on the numerical data set by said setting means and transmitting predetermined protocol signal after a transmission of the dial signals is terminated,
   wherein said transmission means is adapted to transmit the predetermined protocol signal by a number of times corresponding to the control data set by said setting means between the transmission of the dial signals and a transmission of one additional said predetermined protocol signal, wherein said control data includes pause data.

8. An apparatus according to claim 7, wherein said transmission means is adapted, when the control data are set in the middle of a train of numerical data, to set a predetermined pause period between the transmission of the dial signals based on the numerical data preceding the control data and the transmission of the dial signals based on the numerical data succeeding the control data, and, when the control data are set after the train of numerical data, to transmit the predetermined protocol signal.

9. An apparatus according to claim 7, wherein the predetermined protocol signal transmitted by said transmission means is a tone signal of 1100 Hz.

10. An apparatus according to claim 7, wherein said transmission means is adapted to repeatedly transmit the predetermined protocol signal by a number of times corresponding to the number of the control data set by said setting means.

11. An apparatus according to claim 7, further comprising discrimination means for discriminating a response from a called side, in a period corresponding to the control data.

12. A data communication apparatus comprising:
   storing means for storing numerical data and control data; and
   transmission means for transmitting dial signals corresponding to the numerical data stored in said storing means,
   wherein said transmission means discriminates whether or not a transmission of the dial signals is terminated, and transmits a predetermined protocol signal by a number of times corresponding to a number of the control data stored in said storing means after a termination of the transmission of the dial signals, wherein the control data includes pause data.

13. An apparatus according to claim 12, wherein said transmission means enters pauses by a number of times corresponding to the number of the control data stored in said storing means before the termination of the transmission of the dial signals.

14. An apparatus according to claim 12, wherein the predetermined protocol signal includes a tone signal of 1,100 Hz.

* * * * *